US010265561B2

(12) United States Patent
Meis et al.

(10) Patent No.: US 10,265,561 B2
(45) Date of Patent: Apr. 23, 2019

(54) ATMOSPHERIC AIR MONITORING FOR AIRCRAFT FIRE SUPPRESSION

(71) Applicant: The Boeing Company, Chicago, IL (US)

(72) Inventors: Charles Meis, Seattle, WA (US); Rachel Darr, Renton, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/434,979

(22) Filed: Feb. 16, 2017

(65) Prior Publication Data

US 2018/0229062 A1   Aug. 16, 2018

(51) Int. Cl.
| | | |
|---|---|---|
| *A62C 2/04* | (2006.01) | |
| *A62C 3/00* | (2006.01) | |
| *A62C 3/08* | (2006.01) | |
| *A62C 37/44* | (2006.01) | |
| *A62C 99/00* | (2010.01) | |
| *B64D 45/00* | (2006.01) | |

(52) U.S. Cl.
CPC ........... *A62C 99/0018* (2013.01); *A62C 3/08* (2013.01); *A62C 37/44* (2013.01); *A62C 2/04* (2013.01); *A62C 3/002* (2013.01); *B64D 2045/009* (2013.01)

(58) Field of Classification Search
CPC .......... A62C 37/402; A62C 2/04; A62C 3/08; A62C 3/002; A62C 99/0018; B64D 2045/009
USPC .............................................. 169/45, 46, 53
See application file for complete search history.

(56) References Cited

U.S. PATENT DOCUMENTS

| | | | | |
|---|---|---|---|---|
| 4,085,735 A | * | 4/1978 | Kaufman | B01D 47/06 126/299 E |
| 4,275,860 A | * | 6/1981 | Brabazon | B64F 1/28 114/261 |
| 4,643,260 A | * | 2/1987 | Miller | A62C 3/08 169/46 |

(Continued)

FOREIGN PATENT DOCUMENTS

EP          3117876 A1    1/2017

OTHER PUBLICATIONS

Search Report for related European Application No. EP18154737.3; report dated Sep. 6, 2018.

*Primary Examiner* — Chee-Chong Lee
*Assistant Examiner* — Joseph A Greenlund
(74) *Attorney, Agent, or Firm* — Miller, Matthias & Hull LLP

(57) ABSTRACT

A fire suppression system for a compartment of an aircraft includes a sensor system, at least one valve, and a controller. The sensor system is located within the compartment and includes, at least, a first sensor and a second sensor. The first sensor is configured to detect atmospheric substances within the compartment and the second sensor is configured to detect combustion products within the compartment. The at least one valve is configured for regulating flow of a fire suppressant to the compartment. The controller is configured to control flow of the fire suppressant, via the at least one valve, in response to input from the sensor system. The controller provides instructions to discharge the fire suppressant if the first sensor detects atmospheric substances and the second sensor detects combustion products.

17 Claims, 4 Drawing Sheets

(56) References Cited

U.S. PATENT DOCUMENTS

| | | | | |
|---|---|---|---|---|
| 4,711,193 A * | 12/1987 | Latza | ............ | B63J 2/02 114/177 |
| 4,719,973 A * | 1/1988 | Allen | ............ | G08B 29/188 169/23 |
| 6,313,638 B1 * | 11/2001 | Sun | ............ | G01N 27/66 324/464 |
| 6,401,487 B1 * | 6/2002 | Kotliar | ............ | A62C 3/0221 169/45 |
| 6,491,254 B1 * | 12/2002 | Walkinshaw | ............ | A62C 3/08 244/118.5 |
| 6,676,081 B2 * | 1/2004 | Grabow | ............ | A62C 3/08 169/46 |
| 6,851,483 B2 * | 2/2005 | Olander | ............ | A62C 5/00 169/26 |
| 7,028,782 B2 * | 4/2006 | Richardson | ............ | A62C 5/006 169/27 |
| 7,048,231 B2 * | 5/2006 | Jones | ............ | B64D 37/32 244/135 A |
| 7,270,691 B2 * | 9/2007 | Arts | ............ | A61L 9/16 128/205.26 |
| 7,337,856 B2 * | 3/2008 | Lund | ............ | A62C 99/0018 169/6 |
| 7,658,232 B2 * | 2/2010 | Anderson | ............ | A62C 3/14 169/37 |
| 7,717,776 B2 * | 5/2010 | Wagner | ............ | A62C 99/0018 169/11 |
| 7,726,409 B2 * | 6/2010 | Haaland | ............ | A62C 3/06 169/43 |
| 7,849,931 B2 * | 12/2010 | Ng | ............ | A62C 3/08 169/16 |
| 7,871,038 B2 * | 1/2011 | Space | ............ | B64D 13/06 244/118.5 |
| 7,901,618 B2 * | 3/2011 | McVey | ............ | A61L 2/202 422/124 |
| 8,256,524 B2 * | 9/2012 | Bleil | ............ | A62C 3/08 169/11 |
| 8,925,642 B2 * | 1/2015 | Meier | ............ | A62C 3/08 169/11 |
| 8,925,865 B2 * | 1/2015 | Stolte | ............ | B64D 25/00 169/46 |
| 2005/0287052 A1 * | 12/2005 | Ravanello | ............ | B03C 3/32 422/186.07 |
| 2006/0289175 A1 * | 12/2006 | Gutowski | ............ | A62C 2/24 169/46 |
| 2009/0151965 A1 * | 6/2009 | Popp | ............ | A62C 3/002 169/62 |
| 2010/0073172 A1 * | 3/2010 | Lax | ............ | G08B 7/062 340/578 |
| 2011/0297401 A1 * | 12/2011 | Rennie | ............ | G08B 17/10 169/54 |
| 2014/0202718 A1 * | 7/2014 | Meis | ............ | A62C 3/08 169/46 |
| 2014/0360739 A1 * | 12/2014 | Wedowski | ............ | A62C 3/07 169/61 |
| 2015/0034342 A1 * | 2/2015 | Seebaluck | ............ | A62C 37/44 169/61 |
| 2015/0060092 A1 * | 3/2015 | Kho | ............ | A62C 35/58 169/44 |
| 2015/0226439 A1 * | 8/2015 | Mikulec | ............ | F24C 15/2021 99/337 |
| 2016/0059059 A1 * | 3/2016 | Xin | ............ | A62C 37/44 169/46 |
| 2016/0121148 A1 * | 5/2016 | Al-Hebshi | ............ | A62C 35/10 169/61 |

* cited by examiner

ATMOSPHERIC AIR MONITORING FOR AIRCRAFT FIRE SUPPRESSION

TECHNICAL FIELD

The present disclosure relates generally to aircraft fire suppression systems and, more particularly, to atmospheric substance sensing within such aircraft fire suppression systems.

BACKGROUND

Aircraft, particularly commercial aircraft, may include cargo compartments that are partitioned off from passenger compartments within the aircraft. As a safety measure, aircraft of this fashion may include fire suppression systems that are specifically associated with the cargo compartment(s). Such fire suppression systems may operate by introducing a fire suppressant into the compartment, once a combustion event or combustion products associated with a combustion event (e.g., a fire) are detected. In some examples of conventional fire suppression systems, the system may respond to a detected fire in two phases, a knockdown phase followed by a suppression phase. During the knockdown phase, the cargo compartment is flooded with fire suppressant at a high flow rate, whereas during the suppression phase, a lower flow rate of the fire suppressant is provided over an extended period of time.

As the fire suppressants used in such systems may be gaseous or liquid particulates, during detection and/or monitoring phases of the fire suppression systems, the fire suppressants may commingle with combustion products, created by a combustion event. In conventional systems, sensors utilized to detect combustion events via detection of combustion products may provide false alarm signals, due to the existence of fire suppressants commingled with combustion products and/or the general atmospheric air of the cargo compartment. Therefore, false and/or nuisance alarms may cause a flight crew to take unnecessary measures when, in fact, any fire has already been adequately suppressed. Further, false alarms or false monitoring may indicate, to a controller, that excessive flow of fire suppressant is needed in an event wherein a combustion event has or is occurring and said event is, at least in part, suppressed. Therefore, fire suppressant systems, which can accurately delineate between atmospheric substances and combustion products within the atmospheric air of the compartment, are desired. Additionally, fire suppressant systems that include smoke removal for further elimination of false alarms and decreased likelihood of smoke penetration, into the occupied areas of the airplane, are also desired.

SUMMARY

In accordance with one example, a fire suppression system for a compartment of an aircraft is disclosed. The system includes a sensor system, at least one valve, and a controller. The sensor system is located within the compartment and includes, at least, a first sensor and a second sensor. The first sensor is configured to detect atmospheric substances within the compartment and the second sensor is configured to detect combustion products within the compartment. The at least one valve is configured for regulating flow of a fire suppressant to the compartment. The controller is configured to control flow of the fire suppressant, via the at least one valve, in response to input from the sensor system. The controller provides instructions to discharge the fire suppressant if the first sensor detects atmospheric substances and the second sensor detects combustion products.

In a refinement, the system further includes an alarm capable of providing an alarm signal to an operator and the controller is further configured to provide the alarm signal to the operator if the first sensor detects atmospheric substances and the second sensor detects combustion products.

In another refinement, the first sensor is a photoelectric sensor configured to detect atmospheric substances by sensing a difference in obscuration level within the chamber due to existence of atmospheric substances.

In another refinement, the second sensor is an ionization sensor configured to detect molecular ionization of combustion from a fire.

In another refinement, the system further includes a filtration system associated with the compartment and configured to remove combustion products from the compartment.

In a further refinement, the filtration system includes a filter configured to remove combustion products from atmospheric air within the compartment and a fan to draw the atmospheric air from the compartment towards the filter and recirculate the atmospheric air into the compartment.

In another refinement, the system further includes at least one suppressant sensor configured to determine concentration of the fire suppressant within the compartment and the controller is operatively associated with the at least one suppressant sensor and the instructions to discharge the fire suppressant are determined, by the controller, based, at least in part, on the concentration of the fire suppressant within the compartment.

In a further refinement, the fire suppressant is Halon-1301 and the at least one suppressant sensor is configured to determine concentration of Halon-1301 within the compartment.

In another further refinement, the controller is further configured to compare the concentration of the fire suppressant within the compartment with a desired concentration of the fire suppressant for the compartment and the instructions to discharge the fire suppressant are determined, by the controller, based, at least in part, on the comparison of the concentration of the fire suppressant within the compartment and the desired concentration of the fire suppressant for the compartment.

In accordance with another example, a fire suppression system for a compartment of an aircraft is disclosed. The system includes a sensor system, at least one valve, a controller, at least one filter, and at least one fan. The sensor system is located within the compartment and is configured to detect combustion products within the compartment while being capable of differentiating between combustion products and a fire suppressant existing in the compartment. The at least one valve is for regulating flow of the fire suppressant to the compartment. The controller is configured to control flow of the fire suppressant, via the at least one valve, in response to input from the sensor, the controller providing instructions to discharge the fire suppressant if the sensor system detects combustion products within the compartment. The at least one filter is configured to remove combustion products from atmospheric air within the compartment. The at least one fan is configured to draw the atmospheric air from the compartment towards the at least one filter and recirculate the atmospheric air into the compartment.

In a refinement, the at least one filter includes a high-efficiency particulate air (HEPA) filter.

In a further refinement, the HEPA filter is configured such that it filters combustion products out of the atmospheric air, while allowing a substantial majority of particles of the fire suppressant to pass through the HEPA filter and recirculate into the compartment.

In a further refinement, the fire suppressant is Halon-1301 and the HEPA filter is configured such that it allows a substantial majority of Halon-1301 particles to pass through the HEPA filter and recirculate into the compartment.

In another refinement, the at least one fan is disposed proximate to a compartment ceiling of the compartment and the at least one fan draws the atmospheric air into a filtration compartment disposed, in part, above the compartment ceiling, the at least one filter is disposed upstream of the at least one fan and within the filtration compartment and, after passing through the filter, the atmospheric air is recirculated into the compartment, from the filtration compartment, via an exit of the filtration compartment.

In accordance with yet another example, a method of suppressing fire in a cargo compartment of an aircraft is disclosed. The method includes monitoring atmospheric air in the cargo compartment utilizing input from a sensor system. The sensor system is configured to determine if atmospheric substances are present in the atmospheric air and to determine if combustion products are present in the atmospheric air. The method further includes discharging a fire suppressant into the cargo compartment, via at least one valve, if the sensor system determines that atmospheric substances are present in the atmospheric air and combustion products are present in the atmospheric air.

In a refinement, the method further includes continuing to monitor the atmospheric air in the cargo compartment if the sensor system detects atmospheric substances and does not detect combustion products.

In another refinement, the method further includes activating an alarm if the sensor system determines that atmospheric substances are present in the atmospheric air and combustion products are present in the atmospheric air.

In another refinement, the method further includes monitoring concentration of the fire suppressant within the atmospheric air, using a fire suppressant sensor and adjusting flow of the fire suppressant to the cargo compartment, via the at least one valve, if input from the fire suppressant sensor indicates that a current fire suppressant concentration deviates from a desired fire suppressant concentration.

In another refinement, the method includes activating a filtration system, if the sensor system determines that atmospheric substances are present in the atmospheric air and combustion products are present in the atmospheric air.

In a further refinement, the method further includes directing the atmospheric air, at least in part, towards a filter of the filtration system, using a fan of the filtration system, filtering the combustion products, at least in part, out of the atmospheric air, using the filter, and recirculating filtered atmospheric air into the cargo compartment via airflow generated by the fan.

These and other aspects and features will become more readily apparent upon reading the following detailed description when taken in conjunction with the accompanying drawings. In addition, although various features are disclosed in relation to specific examples, it is understood that the various features may be combined with each other, or used alone, with any of the various examples without departing from the scope of the disclosure.

While the present disclosure is susceptible to various modifications and alternative constructions, certain illustrative examples thereof will be shown and described below in detail. The disclosure is not limited to the specific examples disclosed, but instead includes all modifications, alternative constructions, and equivalents thereof.

DETAILED DESCRIPTION

Figure 1:
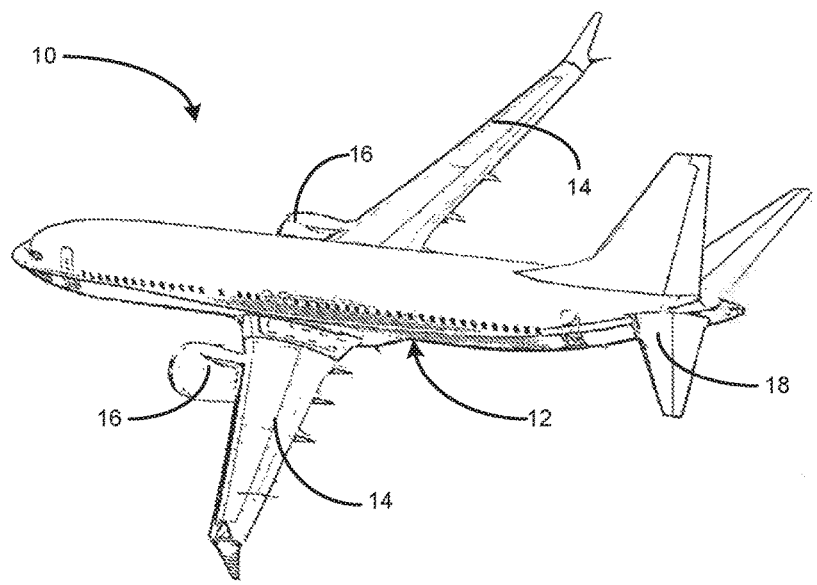
FIG. 1 is a perspective view of an example aircraft, in accordance with the present disclosure.
Figure 2:
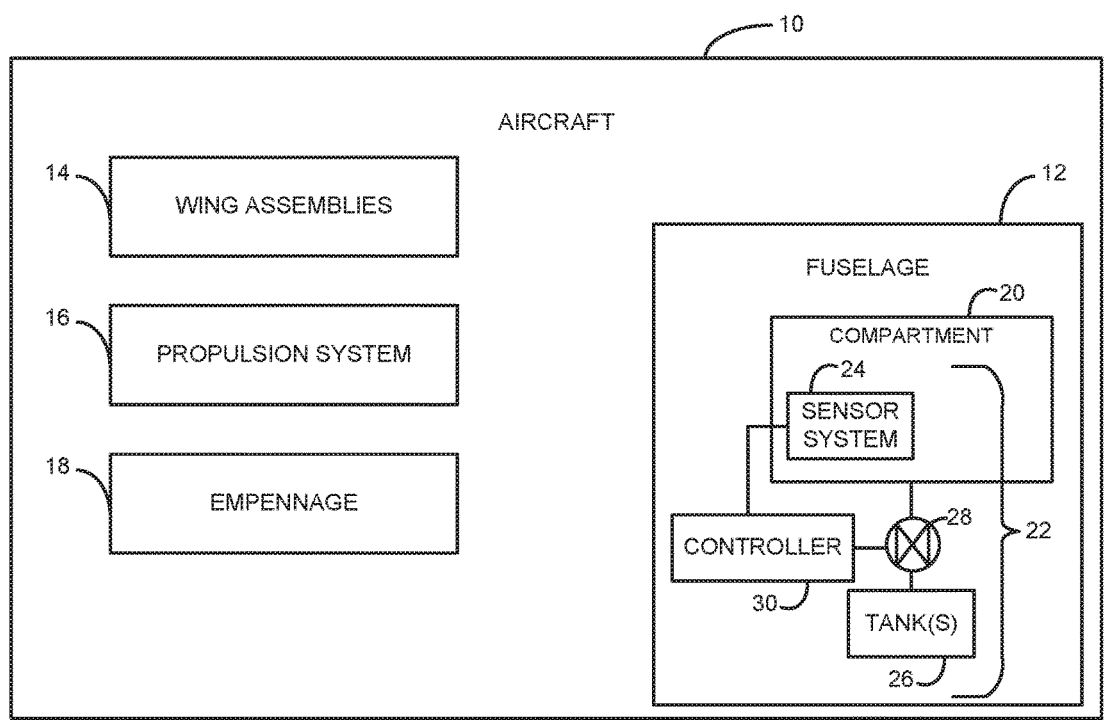
FIG. 2 is a schematic block diagram of the aircraft of FIG. 1, illustrating select elements of a fire suppression system on board the aircraft, in accordance with an embodiment of the disclosure.

An exemplary aircraft 10 is illustrated graphically in FIG. 1 and further illustrated schematically in FIG. 2. The example aircraft 10 is not intended to limit the model or type of aircraft in which the following systems and methods are capable of being utilized to suppress fire in cargo compartments. Accordingly, the systems and methods described herein may be applicable to any additional or alternative aircraft, that include cargo compartments, known in the art.

To that end, the aircraft 10 includes, at least, a fuselage 12, which includes at least one cargo compartment 20, wing assemblies 14, a propulsion system 16, and empennage 18. The aircraft 10 further includes a fire suppression system 22, which includes a sensor system 24, one or more tanks 26 for storing a fire suppressant, at least one valve 28 for regulating flow of the fire suppressant to the compartment 20, and a controller 30. When a fire or combustion event is detected in the compartment 20, the system 22 is activated, whereby the controller 30 controls the valve(s) 28 to regulate a flow of the fire suppressant into the compartment 20. In some examples, the fire suppression system 22 may be configured to only activate while the aircraft 10 is in flight.

Figure 3:
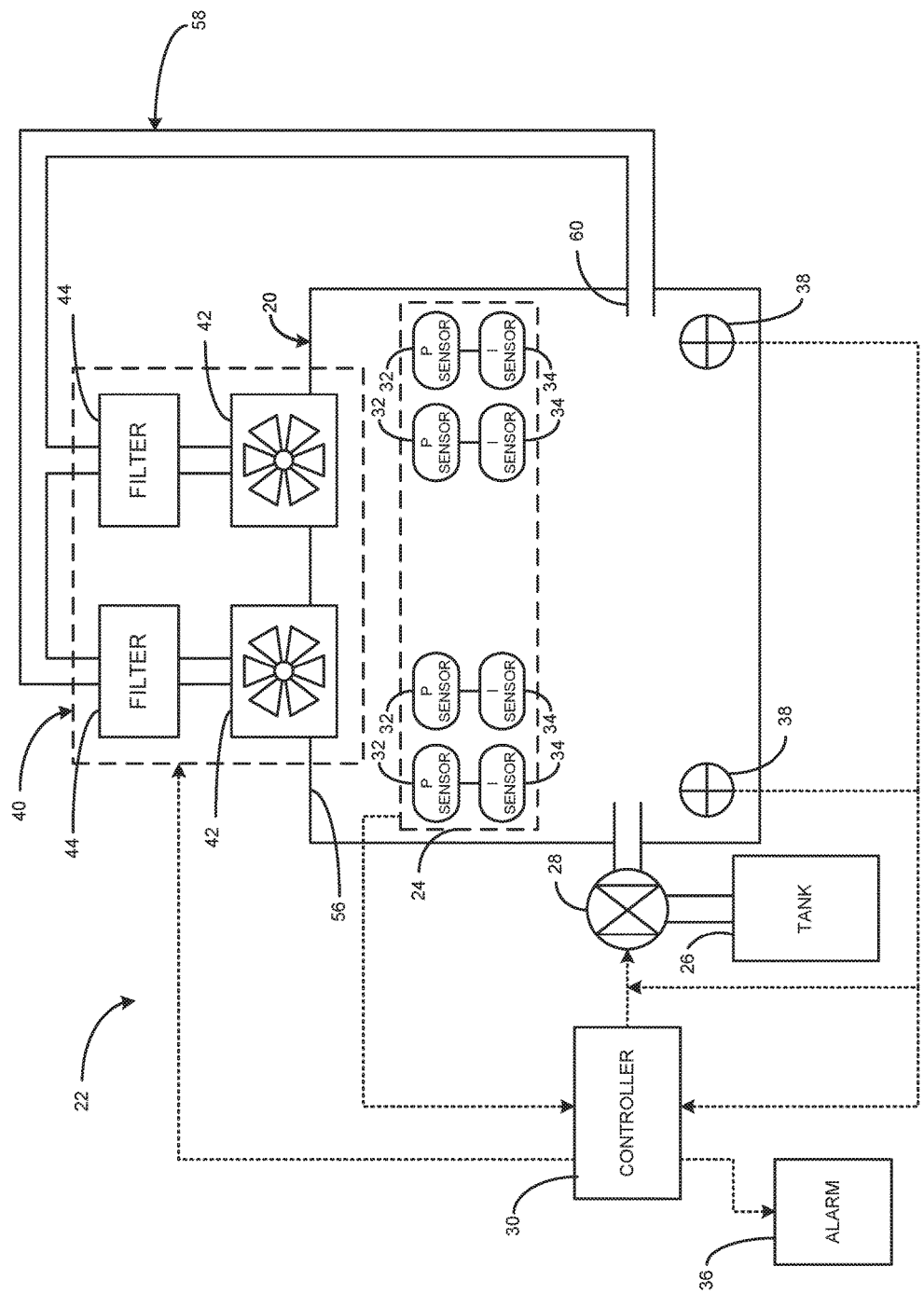
FIG. 3 is a detailed schematic block diagram of the fire suppression system of FIG. 2, illustrating implementation of the fire suppression system relative to a compartment of the aircraft, in accordance with FIGS. 1-2 and the present disclosure.

Turning now to FIG. 3, a more detailed schematic depiction of the fire suppression system 22 is shown, illustrating elements of the fire suppression system 22 having exemplary placement or proximal relation to the compartment 20. Of course, the schematic depiction of FIG. 3 is not to scale and elements thereof are only depicted showing exemplary physical positioning and/or configuration of such elements. To that end, the controller 30 may be located outside of the compartment 20 (e.g., in a flight deck or electronics bay of the aircraft 10), the tanks 26 may be located just outside of the compartment 20 (e.g., along a side of the fuselage 12, at an aft end of the fuselage 12, etc.). Further, while the example of FIG. 3 illustrates just one compartment 20, in examples wherein the aircraft 10 and/or fuselage 12 includes multiple compartments 20, the system 22 may be configured to provide fire suppression to multiple compartments 20 contained in the aircraft 10.

The sensor system 24, as depicted, is located, at least in part, in the compartment 20 and is configured to detect combustion products within the compartment 20, while being capable of differentiating or delineating between combustion products and a fire suppressant existing within atmospheric air in the compartment 20. To that end, the sensor system 24 includes a plurality of sensors that include one or more sensors configured for detecting atmospheric substances (e.g., fire suppressants, combustion products, and any other substance within air of the compartment 20) and one or more sensors configured for detecting combustion products. For detecting atmospheric substances, the sensor system 24 may include one or more photoelectric sensors 32, which are configured to detect atmospheric substances by sensing a difference in visual obscuration level within the compartment 20, due to the existence of such atmospheric substances. In some examples, photoelectric sensors 32 include an optical chamber that senses the difference in obscuration level, due to a foreign atmospheric substance, such as smoke from combustion products.

While photoelectric sensors 32 can quickly detect combustion products, such as smoke, indicative of a fire, photoelectric sensors 32 can also detect other atmospheric substances, such as fire suppressant. Accordingly, in some examples, the photoelectric sensors 32 are utilized in conjunction with one or more ionization sensors 34. Ionization sensors 34 are capable of detecting combustion products and/or fire onlyonly. Particularly, ionization sensors 34 are configured to detect molecular ionization of combustion products from, for example, a fire. Therefore, the ionization sensors 34 are unaffected by the existence of the fire suppressant, as they do not rely on visual obscuration.

For example, if a combustion event occurs and the fire suppressant is discharged in the compartment 20, the photoelectric sensors 32 may still sense obscuration, even if the fire is extinguished, due to the existence of the fire suppressant, while the ionization sensors 34 may cease to detect combustion products as the combustion event slows or ceases, in response to the fire suppressant. Therefore, by using a real-time comparison between the detections of the photoelectric sensors 32 and the ionization sensors 34, the sensor system 24 can differentiate between real combustion products associated with a fire and the fire suppressant used to suppress said fire. Such a comparison may be performed at the sensor level by the sensors of the sensor system 24, by an independent controller of the sensor system 24, and/or input from the sensor system 24 can be utilized by the controller 30 to perform such a comparison.

The controller 30 is utilized to control flow of the fire suppressant, via the at least one valve 28, in response to input from the sensor system 24. Accordingly, the controller 30 is configured to provide instructions to discharge the fire suppressant, via the at least one valve 28, if the photoelectric sensor(s) 32 detect atmospheric substances and the ionization sensor(s) 34 detect combustion products. The controller 30 may be any electronic controller or computing system including a processor which operates to perform operations, execute control algorithms, store data, retrieve data, gather data, and/or any other computing or controlling task desired. The controller 30 may be a single controller or may include more than one controller disposed to control various functions and/or features of the fire suppression system 22 and/or the aircraft 10. Functionality of the controller 30 may be implemented in hardware and/or software and may rely on one or more data maps relating to the operation of the fire suppression system 22 and/or the aircraft 10. To that end, the controller 30 may include internal memory and/or the controller 30 may be otherwise connected to external memory, such as a database or server. The internal memory and/or external memory may include, but are not limited to including, one or more of read only memory (ROM), random access memory (RAM), a portable memory, and the like. Such memory media are examples of nontransitory memory media.

The at least one valve 28 can be any valve known in the art utilized to control the flow of gasses and/or liquids, such as fire suppressants, from a container, such as the tank(s) 26. In some examples the at least one valve 28 is a normally-open (NO) valve, while in some alternative examples, the at least one valve 28 is a normally-closed (NC) valve. Positioning of mechanisms of the at least one valve 28 are controlled by the controller 30, via one or more actuators connected to, embedded within, or otherwise associated with the at least one valve 28.

The fire suppressant contained within the tank(s) 26 can be any suitable liquid and/or gaseous substance capable of suppressing fire within the compartment 20. In some, non-limiting examples, the fire suppressant is Halon-1301, which is a trade name for the chemical bromotrifluoromethane. In such examples, the Halon-1301 is a highly pressurized liquid contained in the one or more tank(s) 26 and released, during combustion events, via the at least one valve 28. Halon-1301 is commonly used as a fire suppressant in cargo compartments for commercial aircraft and, more specifically, is often utilized as a fire suppression agent in satisfaction of typical fire protection provisions provided by government authorities.

In some examples, the fire suppression system 22 further includes an alarm 36, which is capable of providing an alarm signal to an operator of the aircraft 10, an operator of the fire suppression system 22, a remote observant operator, and/or any other operator associated with the aircraft 10. In such examples, the controller 30 is further configured to instruct the alarm 36 to provide the alarm signal to the operator if input from the sensor system 24 indicates that a fire or other combustion event has occurred. The alarm 36 may be configured to provide any type of alarm signal to the operator, such as, but not limited to, a visual alarm signal, an audible alarm signal, a tactile alarm signal, and the like.

To determine information regarding fire suppressant concentration in the compartment 20, in some examples, the system 22 includes one or more suppressant sensors 38, which are configured to determine concentration of the fire suppressant within the compartment 20. In such examples, the controller 30 is operatively associated with the one or more suppressant sensors 38 and the instructions to discharge the fire suppressant are determined based, at least in part, on the concentration of the fire suppressant within the compartment 20. The one or more suppressant sensors 38 may be gas or particulate sensor(s) that draw a small amount of air into a chamber and then physically test the air for suppressant concentration. Accordingly, the one or more suppressant sensors 38 determine fire suppressant concentration and communicate such information to the controller 30. In some examples, multiple suppressant sensors 38 are utilized to determine suppressant concentration at different locations within the compartment 20 and, in some further examples, such information may be used to determine composite suppressant concentration for the compartment 20. In the aforementioned examples wherein the fire suppressant is Halon-1301, the suppressant sensor(s) 38 are configured to determine concentration of Halon-1301, within the compartment 20.

In some examples, the controller 30 compares the concentration of the fire suppressant, determined by the suppressant sensor(s) 38, with a desired concentration of the fire suppressant for the compartment 20 and instructions for discharging the fire suppressant are determined, at least in part, based on such a comparison. The desired concentration of the fire suppressant may be a desired suppressant concentration, either dictated by operator desires or regulatory restriction, that operators of the aircraft 10 desire to maintain during either flight or during and/or after a combustion event in the compartment 20.

Even in scenarios wherein a combustion event or fire is suppressed or partially suppressed, combustion products and/or fire suppressant may continue to linger in the compartment 20 and, in some examples, such lingering atmospheric substances may continue to cause the system 22 to activate the alarm 36 and/or dispense fire suppressant, when no fire exists. In such scenarios, operators of the aircraft 10 may believe a combustion event or fire is occurring, when it has been suppressed. Accordingly, in some examples, the fire suppression system 22 includes a filtration system 40 associated with the compartment 20 that is configured to remove combustion products from the compartment 20.

The filtration system 40 includes one or more fans 42 and one or more filters 44. The filter(s) 44 are configured to remove combustion products from atmospheric air within the compartment 20. Further, the fan(s) 42 are configured to draw the atmospheric air, and any substances contained therein, from the compartment 20 and towards the filter(s) 44. As the atmospheric air passes through the filter(s) 44, via air flow generated by the fan(s) 42, the filter(s) 44 remove combustion products from the air as it passes through the filter(s) 44. After filtration, airflow generated by the fan(s) 42 recirculates the filtered atmospheric air back into the compartment 20. As an additional benefit, the filtration system 40 may maintain proper suppressant distribution in the compartment, as the airflow generated by the fan(s) 42 can draw the fire suppressant near the top of the compartment 20, where fire suppressant concentration may be lacking, in comparison to other portions of the compartment 20, as some fire suppressants are heavier than air and can settle to the bottom of a compartment In some examples, the filter(s) 44 include one or more high-efficiency particulate air (HEPA) filters. HEPA filters filter particulate matter (e.g., combustion products, such as smoke) from atmospheric air by forcing said atmospheric air through a fine mesh, configured to be fine enough to filter out the undesired particulate. Accordingly, in such examples the filters 44 may be HEPA filters having a mesh sized such that the mesh filters substantially all combustion products out of the atmospheric air that passes through the filter(s) 44. Furthermore, the mesh of a HEPA filter of the filter(s) 44 may be sized such that the filter(s) 44 filter out substantially all combustion products, while allowing all or a substantial majority of particles of the fire suppressant to pass through the HEPA filter and recirculate into the compartment 20. In other words, the filter(s) 44 may be configured such that combustion products are filtered out of the atmospheric air, while fire suppressant is not filtered out of the atmospheric air. In the aforementioned examples wherein the fire suppressant is Halon-1301, the filter(s) 44 are configured to allow Halon-1301 particles to pass through the filter(s) 44.

Figure 4:
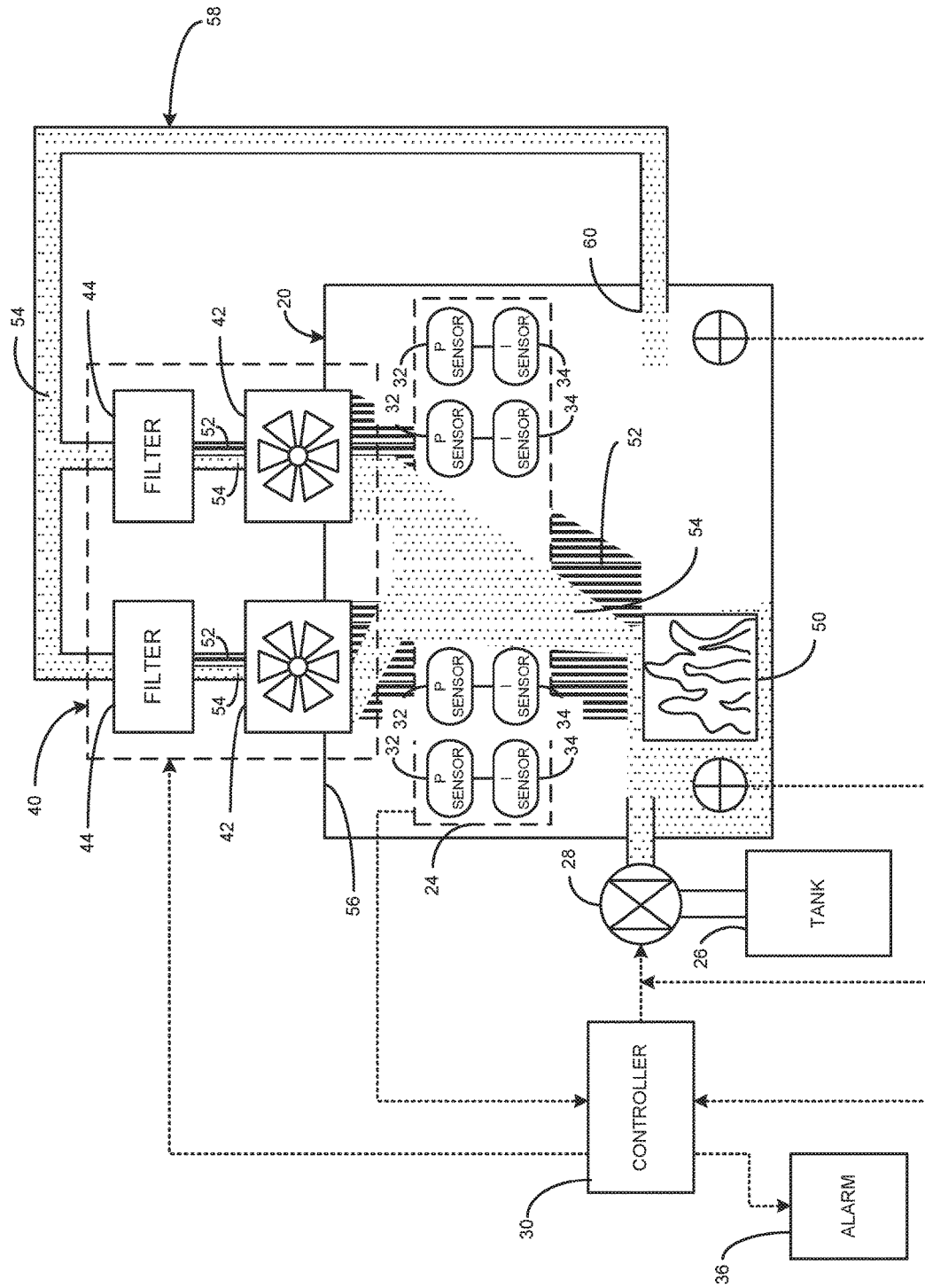
FIG. 4 is another illustration of the schematic block diagram of the fire suppression system of FIG. 3, in which a combustion event has occurred or is occurring, illustrating exemplary flow and/or distribution of atmospheric substances and/or particles within the compartment, in accordance with FIGS. 1-3 and the present disclosure.

To graphically illustrate such selective filtration performed by the filtration system 40, FIG. 4 illustrates the schematic diagram of FIG. 3, but in FIG. 4 the system 22 is in operation in response to a combustion event 50 (e.g., a fire in the compartment 20). As mentioned above, the schematic of FIGS. 3-4 is not to scale nor are any dimensional characteristics intended to show or imply any scale or magnitude of any elements or quantities thereof. Accordingly, the scale and quantity of substances shown are merely intended to show intended proximity of such substances, when the system 22 is in operation during the combustion event 50.

As depicted, the combustion event 50 generates combustion products 52 (depicted as area with vertical stripes), within the compartment 20. In reaction to the combustion products 52 being detected by the sensor system 24, the controller 30 has instructed the at least one valve 28 to discharge a fire suppressant 54 (depicted as area with dotting) into the compartment 20. The fire suppressant 54 is intended to suppress the combustion event 50; however, the fire suppressant 54 may also commingle with the combustion products 52, within the compartment 20, as shown.

The fan(s) 42 are disposed proximate to a compartment ceiling 56 of the compartment 20 and draw atmospheric air, including both the combustion products 52 and the fire suppressant 54, into a filtration compartment 58, which is disposed, at least in part, above the compartment ceiling 56. The fan(s) 42, for example, can be disposed substantially or in part flush with the compartment ceiling 56. The filter(s) 44 are disposed upstream of the fan(s) 42, within the filtration compartment 58, meaning atmospheric air drawn into the filtration compartment 58, by the fan(s) 42, enters the filter(s) 44 prior to passing through the fan(s) 42. Prior to entering the filter(s) 44 for filtration, as shown, the atmospheric air within the filtration compartment 58 may include both the combustion products 52 and the fire suppressant 54. After exiting the filter(s) 44, as shown, the atmospheric air within the filtration compartment 58 is rid of substantially all combustion products 52, while still containing the fire suppressant 54. Upon passing through the filter(s) 44, such filtered atmospheric air is then recirculated into the compartment 20, from the filtration compartment 20, via an exit 60 of the filtration compartment 58.

Figure 5:
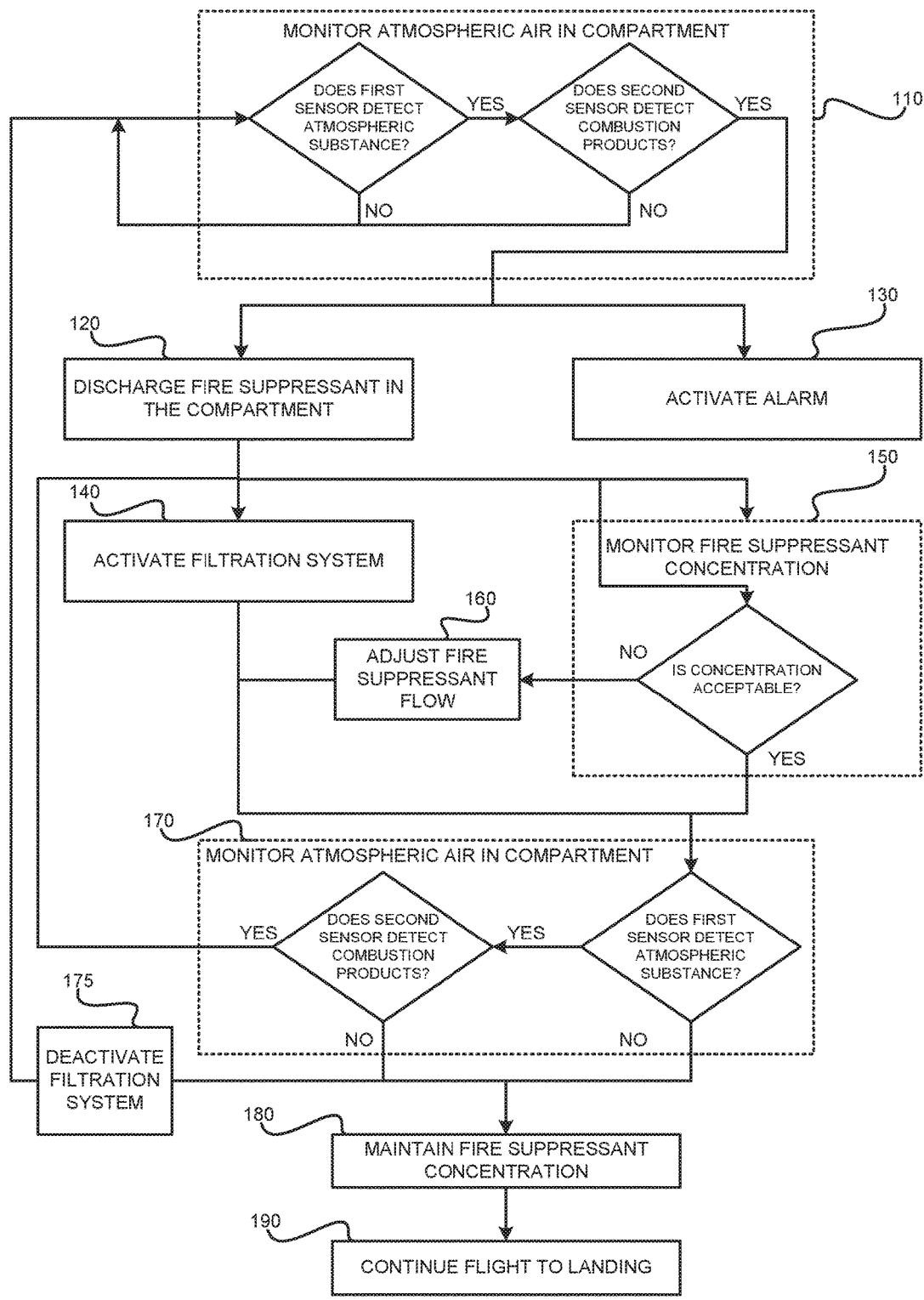
FIG. 5 is an exemplary flowchart for a method for suppressing fire within a cargo compartment of an aircraft, in accordance with an embodiment of the present disclosure.

By utilizing the systems and methods disclosed herein, false fire alarms can be prevented, fire suppressant overuse can be limited, thus reducing costs, and greater air filtration can be achieved. To that end, FIG. 5 illustrates a flowchart for an example method 100 for suppressing fire in a cargo compartment of an aircraft. The method 100 is described, below, with reference to elements of the aircraft 10 and the fire suppression system 22, as described in detail above with reference to FIGS. 1-4. However, the method 100 is certainly not limited to application in conjunction with aircraft 10 and/or the associated system 22 and the method 100 is capable of being performed on or using other systems and/or in the context of other aircraft.

The method 100 begins at block 110, at which the sensor system 24 monitors the atmospheric air within the compartment 20. Accordingly, the photoelectric sensor(s) 32 determine the existence of atmospheric substances and the ionization sensor(s) 34 determine existence of combustion products. If no combustion products are detected, then the method 100 continues by continually monitoring the atmospheric air at block 110; however, if atmospheric substances and combustion products are detected, the method 100 proceeds to block 120 and, optionally, block 130.

At block 120, the fire suppressant is discharged into the compartment 20, via the at least one valve 28, as the sensor system 24 has determined that combustion products are present in the combustion chamber 20. Optionally, in response to the detection of combustion products, the alarm 36 may be activated, as depicted in block 130.

Concurrent or shortly subsequent to the discharge of fire suppressant of block 120, the method 100 includes activating the filtration system 40, as depicted in block 140.

Activating the filtration system 40 initiates filtration, which includes directing the atmospheric air, at least in part, towards the filter(s) 44, using the fan(s) 42, filtering the combustion products, at least in part, out of the atmospheric air, using the filter(s) 44, and recirculating filtered atmospheric air into the cargo compartment 20, via airflow generated by the fan(s) 42.

In some examples, the method 100 includes monitoring fire suppressant concentration in the compartment 20 using the suppressant sensor(s) 38, as depicted in block 150. Such monitoring includes determining if concentration of the fire suppressant, within the atmospheric air of the compartment 20, deviates from an acceptable or desired fire suppressant concentration (e.g., the desired concentration, as discussed above). If the concentration deviates from the desired concentration, then the method 100 includes adjusting the fire suppressant flow, as depicted in block 160.

Each of blocks 120, 140, 150, and 160 eventually flow to block 170, in which the method 100 includes further monitoring of the atmospheric air in the compartment 20, using the sensor system 24, similar to the monitoring of block 110, as depicted in block 170. If combustion products are still detected, the method 100 continues to execute blocks 140, 150, 160 throughout the remainder of the flight, until combustion products are no longer detected in the compartment 20.

When combustion products are no longer detected in the compartment 20, the method 100 may both return to block 110, wherein the atmospheric air is continually monitored to detect potential combustion events and/or combustion products, and the method 100 may proceed to blocks 180 and 190. In some examples, prior to or while returning to block 110, the method 100 may include deactivating the filtration system 40, when combustion products are no longer detected in the compartment 20, as depicted in block 175. At block 180, the controller 30 generates instructions, for the at least one valve 28, to maintain a fire suppressant concentration, within the compartment 20, as the current flight of the aircraft 10 is then continued to its landing destination, as depicted in block 190.

What is claimed is:

1. A fire suppression system for a compartment of an aircraft, the system comprising:
    a sensor system located within the compartment, the sensor system including, at least, a first sensor and a second sensor, the first sensor configured to detect a visual obscuration level within the compartment and the second sensor configured to detect molecular ionization of combustion products within the compartment;
    a suppressant sensor configured to detect a fire suppressant concentration in the compartment;
    at least one valve for regulating flow of a fire suppressant to the compartment; and
    a controller configured to control a flow rate of the fire suppressant, via the at least one valve, in response to input from the sensor system and the suppressant sensor, the controller being configured to:
        adjust the flow rate of the fire suppressant based on the fire suppressant concentration detected by the suppressant sensor when the first sensor detects atmospheric substances exceeding the threshold visual obscuration level and the second sensor detects molecular ionization of combustion products within the compartment; and
        subsequently:
            continue to adjust the flow rate of the fire suppressant based on the fire suppressant concentration detected by the suppressant sensor when the first sensor continues to detect atmospheric substances exceeding the threshold visual obscuration level and the second sensor continues to detect molecular ionization of combustion products; and
            maintain the flow rate of the fire suppressant when the first sensor continues to detect atmospheric substances exceeding the threshold visual obscuration level and the second sensor no longer detects molecular ionization of combustion products within the compartment.

2. The fire suppression system of claim 1, further comprising an alarm capable of providing an alarm signal to an operator, and
    wherein the controller is further configured to instruct the alarm to provide the alarm signal to the operator if the first sensor detects atmospheric substances exceeding the threshold visual obscuration level and the second sensor detects molecular ionization of combustion products.

3. The fire suppression system of claim 1, wherein the first sensor is a photoelectric sensor.

4. The fire suppression system of claim 1, wherein the second sensor is an ionization sensor.

5. The fire suppression system of claim 1, including a filtration system associated with the compartment and configured to remove smoke from the compartment.

6. The fire suppression system of claim 5, wherein the filtration system includes:
    a filter configured to remove smoke from atmospheric air within the compartment; and
    a fan to draw the atmospheric air from the compartment towards the filter and recirculate the atmospheric air into the compartment.

7. The fire suppression system of claim 1, wherein the fire suppressant is Halon-1301 and the at least one suppressant sensor is configured to determine concentration of Halon-1301 within the compartment.

8. The fire suppression system of claim 1, wherein the controller is further configured to compare the concentration of the fire suppressant within the compartment with a desired concentration of the fire suppressant for the compartment, and
    wherein the controller is further configured to adjust the flow rate of the fire suppressant, based, at least in part, on the comparison of the concentration of the fire suppressant within the compartment and the desired concentration of the fire suppressant for the compartment.

9. A fire suppression system for a compartment of an aircraft, the system comprising:
    a sensor system located within the compartment, the sensor system configured to detect a visual obscuration level within the compartment and molecular ionization of combustion products within the compartment;
    a suppressant sensor configured to detect a fire suppressant concentration in the compartment;
    at least one valve for regulating flow of the fire suppressant to the compartment;
    a controller configured to control a flow rate of the fire suppressant, via the at least one valve, in response to input from the sensor system and the suppressant sensor, the controller being configured to:
        adjust the flow rate of the fire suppressant based on the fire suppressant concentration detected by the suppressant sensor when the sensor system detects atmospheric substances exceeding a threshold visual obscuration level and molecular ionization of combustion products within the compartment; and subsequently:

continue to adjust the flow rate of the fire suppressant based on the fire suppressant concentration detected by the suppressant sensor when the sensor system continues to detect atmospheric substances exceeding the threshold visual obscuration level and molecular ionization of combustion products within the compartment; and maintain the flow rate of the fire suppressant when the sensor system detects atmospheric substances exceeding the threshold visual obscuration level but no longer detects molecular ionization of combustion products within the compartment;

at least one filter configured to remove atmospheric substances from atmospheric air within the compartment; and at least one fan configured to draw the atmospheric air from the compartment towards the at least one filter and recirculate the atmospheric air into the compartment.

10. The fire suppression system of claim 9, wherein the at least one filter includes a high-efficiency particulate air (HEPA) filter.

11. The fire suppression system of claim 10, wherein the HEPA filter is configured such that it filters smoke out of the atmospheric air, while allowing a substantial majority of particles of the fire suppressant to pass through the HEPA filter and recirculate into the compartment.

12. The fire suppression system of claim 11, wherein the fire suppressant is Halon-1301 and wherein the HEPA filter is configured such that it allows a substantial majority of Halon-1301 particles to pass through the HEPA filter and recirculate into the compartment.

13. The fire suppression system of claim 9, wherein the at least one fan is proximate to a compartment ceiling of the compartment and the at least one fan draws the atmospheric air into a filtration compartment disposed, in part, above the compartment ceiling, wherein the at least one filter is disposed upstream of the at least one fan and within the filtration compartment, and wherein, after passing through the filter, the atmospheric air is recirculated into the compartment, from the filtration compartment, via an exit of the filtration compartment.

14. A method of suppressing fire in a cargo compartment of an aircraft, the method comprising:

monitoring atmospheric air in the cargo compartment utilizing input from a sensor system and a suppressant sensor, the sensor system configured to determine if atmospheric substances exceeding a threshold visual obscuration level are present in the atmospheric air and to determine if molecular ionization of combustion products are present in the atmospheric air, and the suppressant sensor configured to detect a fire suppressant concentration in the compartment;

adjusting a flow rate of fire suppressant discharged into the cargo compartment, via at least one valve, based on the fire suppressant concentration detected by the suppressant sensor when the sensor system determines that atmospheric substances exceeding the threshold visual obscuration level are present in the atmospheric air and molecular ionization of combustion products are present in the atmospheric air; and subsequently:

continuing to adjust the flow rate of the fire suppressant based on the fire suppressant concentration detected by the suppressant sensor when the sensor system continues to detect atmospheric substances exceeding the threshold visual obscuration level and molecular ionization of combustion products in the atmospheric air; and maintaining the flow rate of the fire suppressant when the sensor system detects atmospheric substances exceeding the threshold visual obscuration level but no longer detects molecular ionization of combustion products in the atmospheric air.

15. The method of claim 14, further comprising activating an alarm if the sensor system determines that atmospheric substances exceeding the threshold visual obscuration level are present in the atmospheric air and molecular ionization of combustion products is present in the atmospheric air.

16. The method of claim 14, further comprising activating a filtration system, if the sensor system determines that atmospheric substances exceeding the threshold visual obscuration level are present in the atmospheric air and molecular ionization of combustion products is present in the atmospheric air.

17. The method of claim 16, further comprising directing the atmospheric air, at least in part, towards a filter of the filtration system, using a fan of the filtration system;

filtering smoke, at least in part, out of the atmospheric air, using the filter; and recirculating filtered atmospheric air into the cargo compartment via airflow generated by the fan.

* * * * *